United States Patent
Tanabe et al.

(10) Patent No.: US 7,528,337 B2
(45) Date of Patent: May 5, 2009

(54) PRESSURE SENSITIVE CONDUCTIVE SHEET AND PANEL SWITCH USING SAME

(75) Inventors: Koji Tanabe, Osaka (JP); Hirotoshi Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/103,149

(22) Filed: Apr. 15, 2008

(65) Prior Publication Data

US 2008/0283380 A1 Nov. 20, 2008

(30) Foreign Application Priority Data

May 15, 2007 (JP) ............................ 2007-128930
Oct. 23, 2007 (JP) ............................ 2007-274978

(51) Int. Cl.
*H01H 1/10* (2006.01)

(52) U.S. Cl. ............... 200/511; 200/512; 200/85 R; 338/99

(58) Field of Classification Search ............ 200/511, 200/512, 61.42–61.44, 85 R, 86 R, 86 A; 341/22, 32–34; 345/156, 168, 169, 174, 345/173, 176; 338/99

See application file for complete search history.

(56) References Cited

U.S. PATENT DOCUMENTS

| | | | | |
|---|---|---|---|---|
| 3,806,471 A | * | 4/1974 | Mitchell | ............... 252/519.31 |
| 4,295,699 A | * | 10/1981 | DuRocher | .................. 439/86 |
| 4,876,419 A | * | 10/1989 | Lodini | ..................... 200/86 R |
| 4,876,420 A | * | 10/1989 | Lodini | ..................... 200/86 R |
| 6,054,664 A | * | 4/2000 | Ariga et al. | ................. 200/512 |
| 6,483,055 B1 | * | 11/2002 | Tanabe et al. | ............. 200/85 A |
| 6,590,177 B2 | * | 7/2003 | Takahashi et al. | ........... 200/512 |
| 6,809,280 B2 | * | 10/2004 | Divigalpitiya et al. | ...... 200/512 |
| 6,847,355 B1 | * | 1/2005 | Nishikawa et al. | .......... 345/173 |
| 7,112,755 B2 | * | 9/2006 | Kitano et al. | ............... 200/511 |

FOREIGN PATENT DOCUMENTS

JP 2006-236988 9/2006

* cited by examiner

*Primary Examiner*—Michael A Friedhofer
(74) *Attorney, Agent, or Firm*—Pearne & Gordon LLP

(57) ABSTRACT

A first resistor layer is formed on the lower surface of a base in film form, and at the same time, a second resistor layer in which particles of different particle diameters are dispersed is formed and layered on the lower surface of the first resistor layer, and thus, a pressure sensitive conductive sheet is formed. In this configuration, the second resistor layer in uneven form makes contact with the fixed contacts in accordance with a pressing force so that electrical connection is made via the second resistor layer and the first resistor layer, and therefore, a thin panel switch with little fluctuation in the resistance value resulting from repeated operation where a stable resistance value can be gained can be realized.

2 Claims, 5 Drawing Sheets

PRESSURE SENSITIVE CONDUCTIVE SHEET AND PANEL SWITCH USING SAME

BACKGROUND OF THE INVENTION

1. Field of the Invention

The present invention relates to a pressure sensitive conductive sheet used mainly for the operation of various electronics, as well as a panel switch using the same.

2. Description of the Related Art

In recent years, as the functions and types of electronics, such as cellular phones and car navigation systems, have increased, various types of panel switches which make operation possible without failure have been in demand, as panel switches used for the operation of such electronics.

These conventional panel switches are described with reference to FIGS. 8 and 9. Here, in the cross sectional diagram among these figures, the configuration is shown with the dimensions enlarged in the direction of the thickness for ease of understanding.

FIG. 8 is a cross sectional diagram showing a conventional panel switch. In FIG. 8, pressure sensitive conductive sheet 1 is formed of base 2, for example of insulating silicone rubber. Base 2 has an indeterminate form with carbon or the like dispersed in silicone or the like, and conductive particles 3 having a size of 20 μm to 200 μm are dispersed in this. Substrate 4 is placed on the lower surface of pressure sensitive conductive sheet 1, and plurality of fixed contacts 5A and 5B made of silver or carbon are formed on the upper surface thereof. In addition, spacer 6 is formed of an insulating resin in such a manner as to surround fixed contacts 5A and 5B between pressure sensitive conductive sheet 1 and substrate 4. Thus, a panel switch is formed of the lower surface of pressure sensitive conductive sheet 1 and fixed contacts 5A and 5B, which face each other.

The thus formed panel switch is mounted in an operation portion of an electronic in such a manner that plurality of fixed contacts 5A and 5B are connected to an electronic circuit (not shown) in the electronic via lead wires (not shown) or the like.

In the above described configuration, when the upper surface of pressure sensitive conductive sheet 1 is pressed through an operation, pressure sensitive conductive sheet 1 bends downward, so that the lower surface makes contact with fixed contacts 5A and 5B. Then, conductive particles 3 inside base 2 approach and make contact with each other, when compressed through the pressing force, and thus, fixed contact 5A and fixed contact 5B are electrically connected via these conductive particles 3.

FIG. 9 is a graph showing the characteristics of the resistance of a conventional panel switch. As shown by curve A in FIG. 9, the number and contact area of conductive particles 3 which make contact with each other inside base 2 increase and the resistance value becomes smaller when additional pressing force is applied. Thus, the electronic circuit detects this electrical connection and change in the resistance value, so that operation of electronics having various functions becomes possible using this configuration.

Pressure sensitive conductive sheet 1 used in such a panel switch is formed in such a manner that a predetermined resistance value can be gained when base 2 is elastically deformed through a pressing force, and thus, conductive particles 3 inside base 2 are made to make contact with each other, as described above, and therefore, fluctuation in the resistance value resulting from repeated operation is great. As shown in FIG. 9, in some cases, change in the resistance value shifts from curve A to curve B after several thousands of pressing operations.

In some cases, for example, the resistance value changes by almost one digit, depending on the pressing force, so that resistance value R1 of several tens of kΩ when pressing force P of 2 N to 10 N is applied changes to resistance value R2 of several kΩ for the same pressing force P after the pressing operation has been repeated. Therefore, it is necessary to set the electronic circuit for detecting change in the resistance value taking into account such change.

In addition, pressure sensitive conductive sheet 1 is formed by dispersing conductive particles 3 inside base 2 made of silicone rubber or the like, which easily deforms, and a certain thickness is required. Usually a sheet having a thickness of approximately 0.3 mm to 1 mm is used. Here, Unexamined Japanese Patent Publication No. 2006-236988, for example, is known as a prior art document relating to the invention of the present application.

In the above described conventional panel switch, however, the resistance value changes greatly as a result of repeated operation of pressure sensitive sheet 1, and therefore, it is necessary to detect the resistance value in accordance with this fluctuation. In addition, it is also difficult to achieve total reduction in the thickness because a certain thickness is required.

SUMMARY OF THE INVENTION

The present invention provides a pressure sensitive conductive sheet where the change in the resistance value is small, operation is possible without failure, and reduction in the thickness is possible, as well as a panel switch using the same.

The pressure sensitive conductive sheet according to the present invention is formed by forming a first resistor layer on the lower surface of a base in film form and forming and layering a second resistor layer in which particles of different particle diameters are dispersed on the lower surface of the first resistor layer. Thus, the second resistor layer, which is in uneven form due to the particles having different particle diameters, makes contact with fixed contacts or the like in accordance with the pressing force, and at the same time, the fixed contacts or the like are electrically connected via the second resistor layer and the first resistor layer. In this configuration, stable change in the resistance value with little fluctuation in the resistance value resulting from repeated operation can be gained, and at the same time, reduction in the thickness can be achieved, by forming the two resistor layers in such a manner that they are layered on the lower surface of the base.

The panel switch according to the present invention is formed by arranging a substrate where a plurality of fixed contacts are formed on the lower surface of the above described pressure sensitive conductive sheet. With this configuration, a panel switch with little fluctuation in the resistance value where operation is possible without failure and reduction in the thickness is possible can be realized.

As described above, according to the present invention, a pressure sensitive conductive sheet which makes operation possible without failure and makes reduction in the thickness possible, as well as a panel switch using the same, can be realized.

DETAILED DESCRIPTION OF THE PREFERRED EMBODIMENT

In the following, the embodiments of the present invention are described with reference to FIGS. 1 to 7C.

Here, in the cross sectional diagrams among these figures, the configuration is shown with the dimensions enlarged in the direction of the thickness for ease of understanding.

First Embodiment

Figure 1:
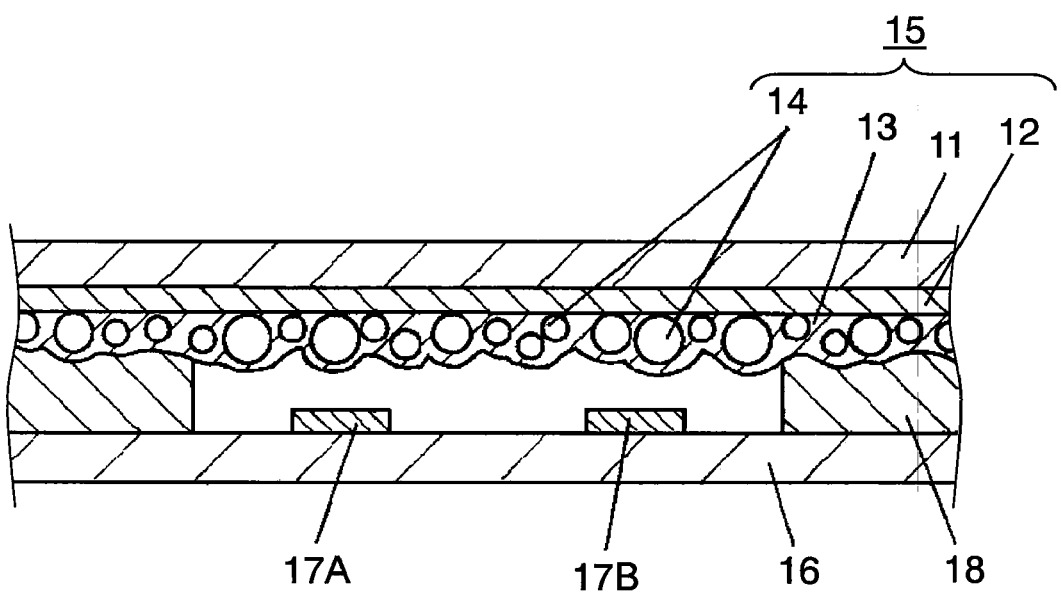
FIG. 1 is a cross sectional diagram showing a panel switch according to the first embodiment of the present invention.

FIG. 1 is a cross sectional diagram showing a panel switch according to a first embodiment of the present invention. In FIG. 1, base 11 is in film form with a thickness of 25 μm to 200 μm and made of a polyethylene terephthalate, polycarbonate, polyimide or the like. First resistor layer 12 having a sheet resistance value of 0.5 kΩ to 30 kΩ/□ is formed of a synthetic resin, such as phenol, epoxy, phenoxy or fluorine rubber, in which a carbon powder is dispersed on the lower surface of base 11.

The second resistor layer is formed of a synthetic resin in which a carbon powder is dispersed so as to have a sheet resistance value of 50 kΩ to 5 MΩ/□ and a thickness of 1 μm to 50 μm, and layered on the lower surface of first resistor layer 12. Furthermore, 10 wt % to 80 wt % of particles 14 of urethane, glass or the like in spherical form with different particle diameters, ranging from 5 μm to 100 μm, are dispersed inside second resistor layer 13, and thus, pressure sensitive conductive sheet 15 is formed.

Pressure sensitive conductive sheet 15 is fabricated by forming first resistor layer 12 on base 11 in accordance with screen printing, and after that forming and layering second resistor layer 13 in which particles 14 are dispersed on first resistor layer 12 in accordance with screen printing using a plate with a mesh of SUS 300 to 100. Substrate 16 is in film form and made of polyethylene terephthalate, polycarbonate or the like, or in plate form and made of paper phenol, epoxy with glass in it or the like. Substrate 16 is arranged on the lower surface of pressure sensitive conductive sheet 15. In addition, plurality of fixed contacts 17A and 17B are formed on the upper surface of substrate 16 from silver, carbon, copper foil or the like, with intervals of approximately 0.2 mm in between.

Spacer 18 is formed between pressure sensitive conductive sheet 15 and substrate 16 from an insulating resin, such as polyester or epoxy, in such a manner as to surround fixed contacts 17A and 17B. Thus, a panel switch is formed in such a manner that second resistor layer 13 and fixed contacts 17A and 17B face each other with a gap of approximately 10 μm to 100 μm in between.

The thus formed panel switch is mounted on an operation portion of an electronic. Then, fixed contacts 17A and 17B are connected to an electronic circuit (not shown) of the electronic via lead wires (not shown).

Figure 2:
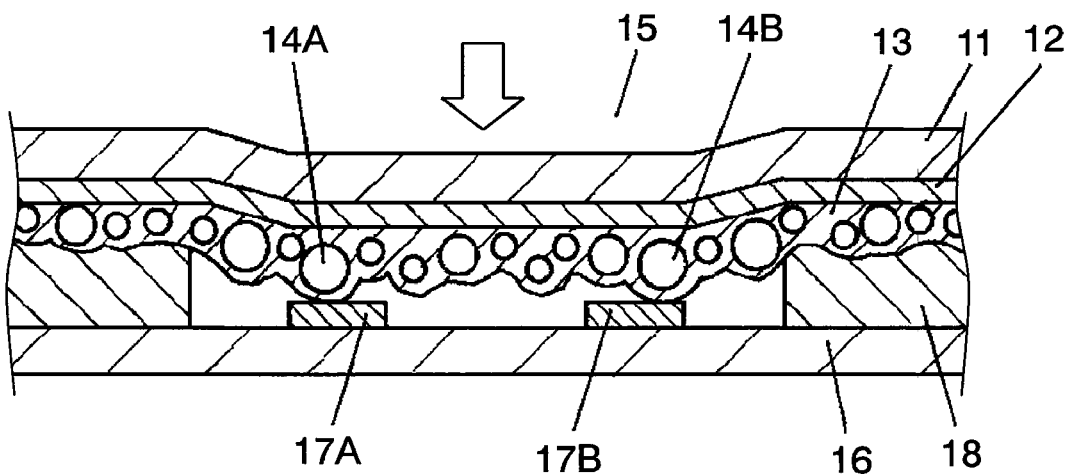
FIG. 2 is a cross sectional diagram showing the panel switch according to the first embodiment of the present invention at the time of a pressing operation.

FIG. 2 is a cross sectional diagram showing the panel switch according to the first embodiment of the present invention at the time of a pressing operation. In FIG. 2, when the upper surface of pressure sensitive conductive sheet 15 is pressed through an operation, pressure sensitive conductive sheet 15 bends down so that the portion of second resistor layer 13 where particles 14A and 14B having a large particle diameter are dispersed makes contact with fixed contacts 17A and 17B. Thus, fixed contact 17A and fixed contact 17B are electrically connected via second resistor layer 13 and first resistor layer 12. At this time, the portions which make contact with fixed contacts 17A and 17B are mainly particles 14A and 14B having a large particle diameter, which are dispersed inside second resistor layer 13.

Figure 3:
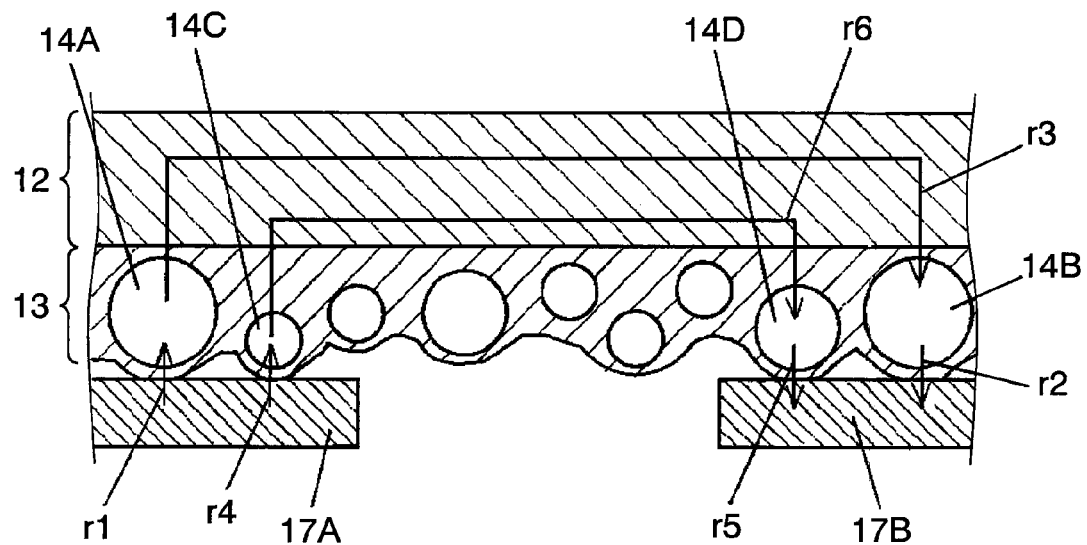
FIG. 3 is an enlarged cross sectional diagram showing the panel switch according to the first embodiment of the present invention.

FIG. 3 is an enlarged cross sectional diagram showing the panel switch according to the first embodiment of the present invention. In FIG. 3, when additional pressing force is applied, the portions where particles 14C and 14D having a smaller particle diameter than particles 14A and 14B are dispersed inside second resistor layer 13 also make contact with fixed contacts 17A and 17B. As a result, the resistance value between fixed contact 17A and fixed contact 17B changes.

Figure 4:
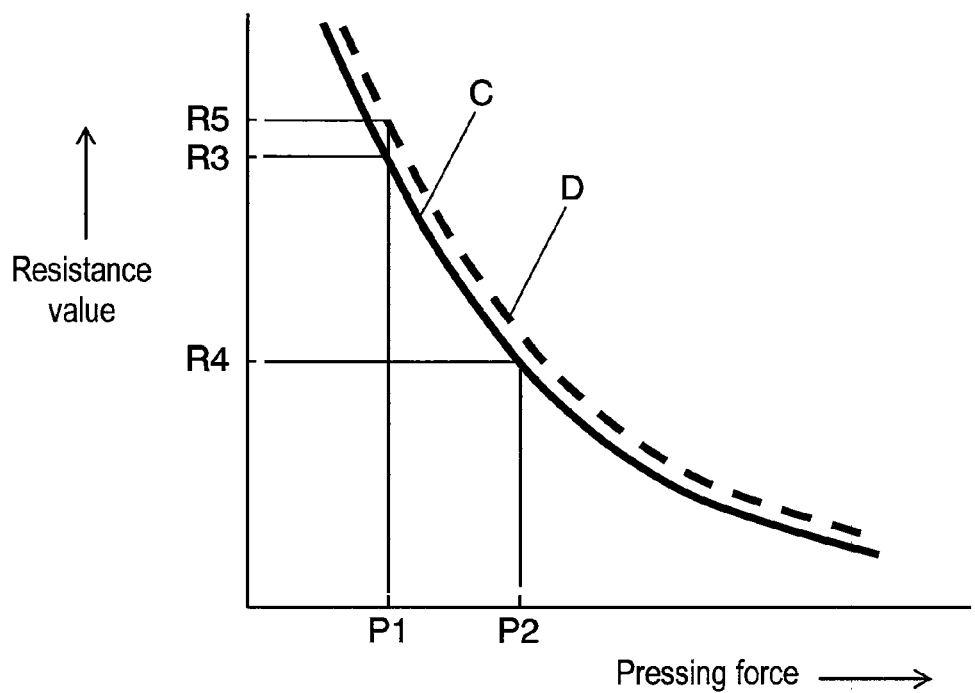
FIG. 4 is a graph showing the characteristics of the resistance of the panel switch according to the first embodiment of the present invention.

FIG. 4 is a graph showing the characteristics of the resistance of the panel switch according to the first embodiment of the present invention. In FIG. 4, the resistance value between fixed contact 17A and fixed contact 17B in a state where only the portions where particles 14A and 14B having a large particle diameter are dispersed inside the second resistor layer make contact when pressed with a small pressing force P1 is indicated by R3. The resistance value R3 is the sum of the contact resistance r1 and r2 between fixed contact 17A and a portion of second resistor layer 13 and between fixed contact 17B and a portion of second resistor layer 13 in FIG. 3, and conductor resistance r3 of first resistor layer 12 and second resistor layer 13 between particle 14A and particle 14B.

In contrast, the resistance value in a state where the portions where particles 14C and 14D having a small particle diameter are dispersed inside second resistor layer 13 also make contact with fixed contact 17A and fixed contact 17B when pressed with a pressing force P2 which is greater than P1 is indicated by R4. Resistance value R4 is gained by adding contact resistance r4 and r5 in these portions, and the conductor resistance r6 are added to resistance value R3 in parallel, as in FIG. 3. Accordingly, resistance value R4 is smaller than resistance value R3.

As described above, as the pressing force increases, the number of places where second resistor layer 13 in uneven form due to particles 14 having different particle diameters makes contact with fixed contacts 17A and 17B increases. Thus, the conductor resistance of second resistor layer 13 and first resistor layer 12 having different sheet resistance values is added to the contact resistance, so that the resistance value changes as in curve C. In addition, the electronic circuit detects change in the electrical connection between fixed contact 17A and fixed contact 17B and the resistance value, and thus, electronics with various functions can be operated.

In the case where the above described pressing operation is repeated, fluctuation in the resistance value is small. As shown in FIG. 4, for example, even when the characteristics shift from curve C to curve D as after one million pressing operations, the difference between resistance values R3 and R5 for pressing force P1 becomes several kΩ in the configuration. That is to say, second resistor layer 13, which is in uneven form due to particles 14 having different particle diameters, makes contact with fixed contacts 17A and 17B in accordance with the pressing force, and at the same time, electrical connection is made via second resistor layer 13 and first resistor layer 12 having different sheet resistance values, and therefore, stable change in the resistance value with little fluctuation resulting from repeated operation can be gained.

In the above description, the sheet resistance value of first resistor layer 12 is 0.5 kΩ to 30 kΩ/□, and the sheet resistance value of second resistor layer 13 is 50 kΩ to 5 MΩ/□. However, it is preferable for first resistor layer 12 to have a sheet resistance value of 2 kΩ to 10 kΩ/□ and for second resistor layer 13 to have a sheet resistance value of 100 kΩ to 1 MΩ/□, and in addition, it is preferable for the ratio of particles 14 dispersed inside second resistor layer 13 to be 50 wt % to 70 wt %.

Figure 5:
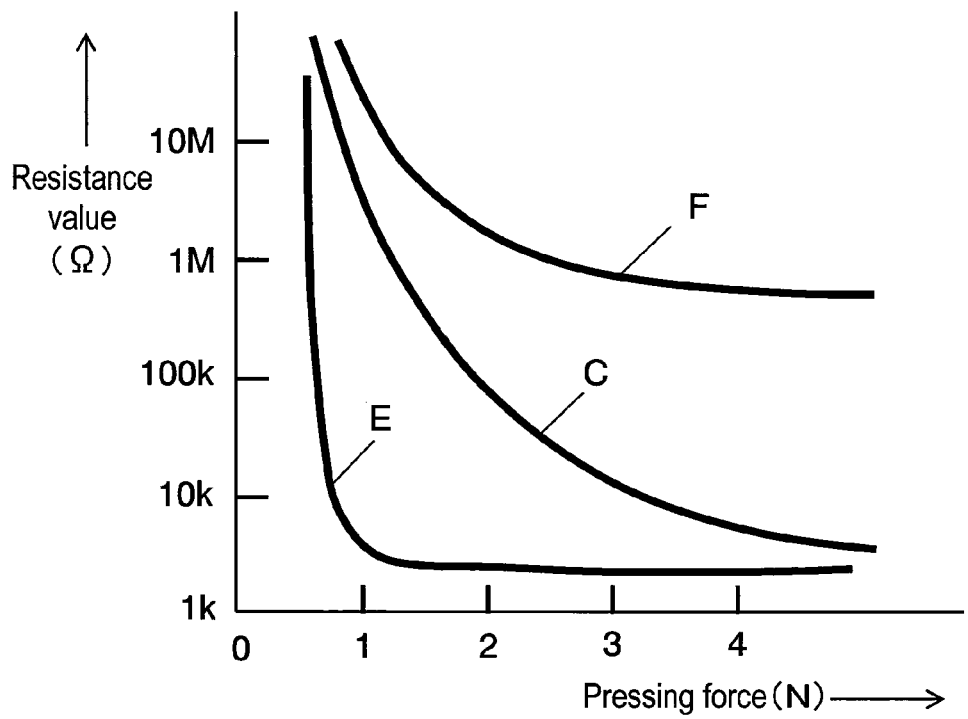
FIG. 5 is a graph showing the characteristics of the measured resistance of the panel switch according to the first embodiment of the present invention.

FIG. 5 is a graph showing the characteristics of the measured resistance of the panel switch according to the first embodiment of the present invention. In FIG. 5, in the case where the sheet resistance value of first resistor layer 12 and second resistor layer 13 is too small, the resistance value becomes small quickly with a small pressing force, as shown by curve E. In addition, in the case where the sheet resistance value is too great, the change in the resistance value becomes small relative to change in the pressing force, as shown by curve F. However, the sheet resistance value described above can provide smooth change in the resistance value in accordance with the pressing force, as shown by curve C.

In addition, pressure sensitive conductive sheet 15 is formed through printing in such a manner that first resistor layer 12 and second resistor layer 13 are layered on base 11 in film form, and therefore, pressure sensitive conductive sheet 15 can be formed so as to have a thickness of 0.3 mm or less, and thus, it becomes easy to achieve reduction in the thickness.

As described above, according to the present first embodiment, first resistor layer 12 is formed on the lower surface of base 11 in film form and second resistor layer 13, in which particles 14 of different particle diameters are dispersed, is formed and layered on the lower surface of first resistor layer 12, and thus, second resistor layer 13 in uneven form makes contact with fixed contacts 17A and 17B in accordance with the pressing force. In addition, electrical connection is made via second resistor layer 13 and first resistor layer 12 having different sheet resistance values, and therefore, pressure sensitive conductive sheet 15 where stable change in the resistance value with little fluctuation resulting from repeated operation can be gained and it is possible to reduce the thickness can be gained. In addition, substrate 16 where plurality of fixed contacts 17A and 17B are formed can be arranged on the lower surface of this pressure sensitive conductive sheet 15, and thus, a panel switch with little fluctuation in the resistance value where operation is possible without failure and reduction in the thickness is possible can be realized.

Second Embodiment

The second embodiment is described below. Here, the same symbols are attached to portions having the same configuration as in the first embodiment, and the detailed descriptions thereof are omitted.

Figure 6:
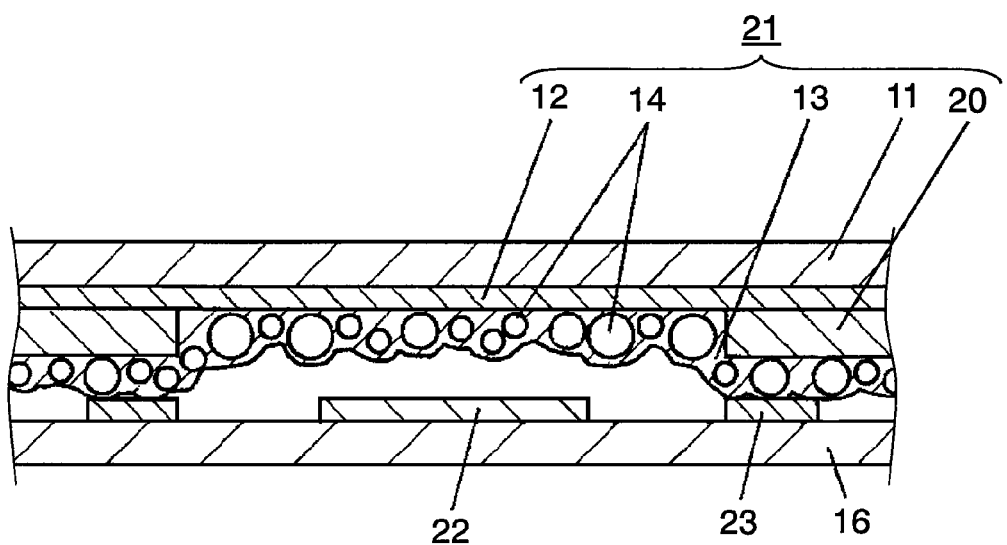
FIG. 6 is a cross sectional diagram showing a panel switch according to the second embodiment of the present invention.

FIG. 6 is a cross sectional diagram showing a panel switch according to the second embodiment of the present invention. In FIG. 6, first resistor layer 12 having a sheet resistance value of 0.5 kΩ to 30 kΩ/□ is formed on the lower surface of base 11 in film form which is the same as in the first embodiment. In the present second embodiment, however, spacer 20 is formed from an insulating resin, such as polyester or epoxy, around the outer periphery of the center portion on the lower surface of first resistor layer 12.

In addition, second resistor layer 13 where particles 14 having a sheet resistance value of 50 kΩ to 5 MΩ/□ in which particles 14 are dispersed is formed and layered on the lower surface in the center portion of first resistor layer 12 and the lower surface of spacer 20. Substrate 16 is a substrate in film form or in plate form, and center fixed contact 22 is formed in circular form on the upper surface of this center portion from silver, carbon, copper foil or the like. In addition, outer periphery fixed contact 23 in ring form or horseshoe form is formed around the outer periphery.

Second resistor layer 13 on the lower surface of spacer 20 is mounted on this outer periphery fixed contact 23. In addition, the contact portion is pasted and connected using an anisotropic conductive adhesive (not shown), or through thermo compression bonding or the like. Thus, a panel switch is formed in such a manner that the lower surface of the center portion of second resistor layer 13 and center fixed contact 22 face each other with a gap of approximately 10 μm to 100 μm in between.

As in the case of the first embodiment, the thus formed panel switch is mounted on the operation portion of an electronic, and center fixed contact 22 and outer periphery fixed contact 23 are connected to an electronic circuit (not shown) of the electronic via lead wires (not shown).

In the above described configuration, when the upper surface of pressure sensitive conductive sheet 21 is pressed through an operation, the center portion of pressure sensitive conductive sheet 21 bends down. Then, the portions where particles 14 having a large particle diameter are dispersed inside second resistor layer 13 make contact with center fixed contact 22, and thus, center fixed contact 22 and outer periphery fixed contact 23 are electrically connected via second resistor layer 13 and first resistor layer 12, which are located in between.

When additional pressing force is applied, the portions where particles 14 having a small diameter are dispersed inside second resistor layer 13 also make contact with center fixed contact 22, and thus, the resistance value between center fixed contact 22 and outer periphery fixed contact 23 changes. That is to say, according to the present second embodiment, as the pressing force increases, the number of portions where the center portion of second resistor layer 13, which is in uneven form due to particles 14 having different particle diameters, make contact with center fixed contact 22 increases. Thus, the conductor resistance of second resistor layer 13 and first resistor layer 12 having different sheet resistance values is added, so that the resistance value changes between center fixed contact 22 and outer periphery fixed contact 23.

Figure 7A:
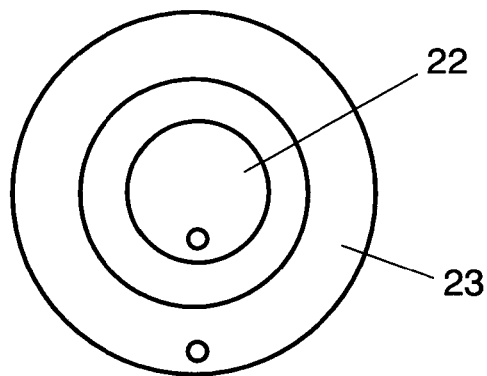
FIG. 7A is a partial plan diagram showing arrangements of fixed contacts in a panel switch according to the second embodiment of the present invention.

FIG. 7A is a partial plan view showing arrangements of fixed contacts in a panel switch according to the second embodiment of the present invention. In FIG. 7A, center fixed contact 22 in approximately circular form is formed on the upper surface of substrate 16, and outer periphery fixed contact 23 in ring form or horseshoe form is formed around the outer periphery.

Figure 7B:
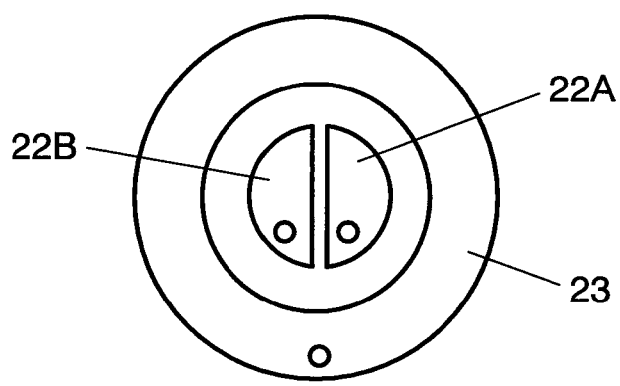
FIG. 7B is a partial plan diagram showing arrangements of fixed contacts in another panel switch according to the second embodiment of the present invention.

FIG. 7B is a partial plan view showing arrangements of fixed contacts in another panel switch according to the second embodiment of the present invention. In FIG. 7B, center fixed contacts 22A and 22B in semicircular form are provided within outer periphery fixed contact 23, and thus, the output can have two resistance values between center fixed contact 22A and outer periphery fixed contact 23, as well as between center fixed contact 22B and outer periphery fixed contact 23, in the configuration.

Figure 7C:
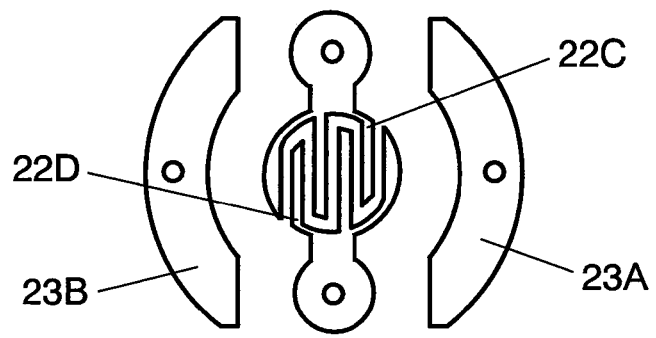
FIG. 7C is a partial plan diagram showing arrangements of fixed contacts in still another panel switch according to the second embodiment of the present invention.
Figure 8:
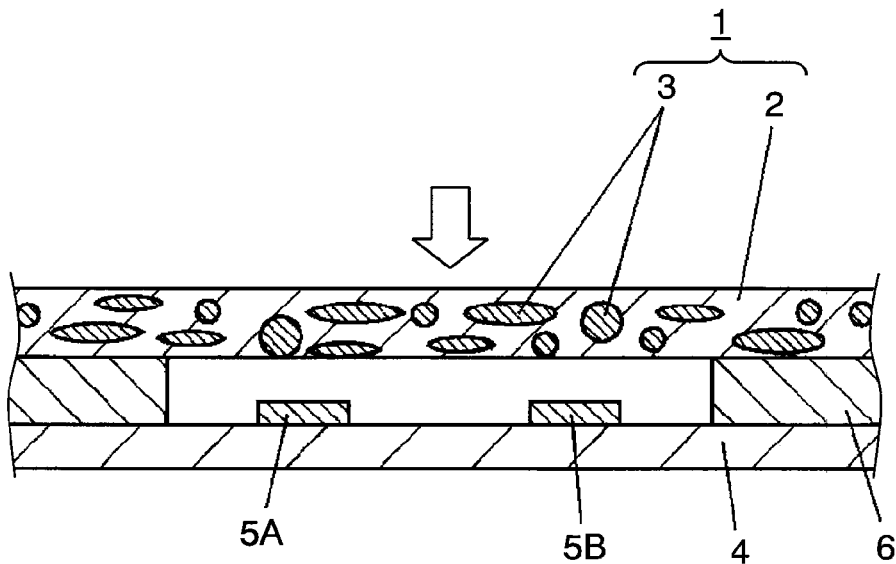
FIG. 8 is a cross sectional diagram showing a conventional panel switch.
Figure 9:
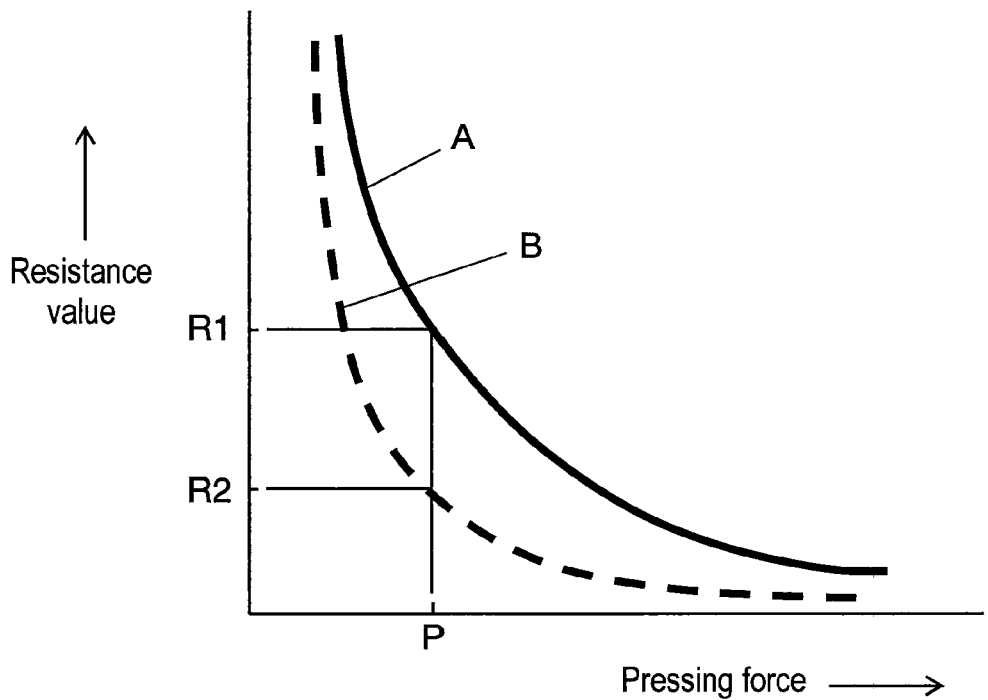
FIG. 9 is a diagram showing the characteristics of the resistance of the conventional panel switch.

FIG. 7C is a partial plan view showing arrangements of fixed contacts in still another panel switch according to the second embodiment of the present invention. Two center fixed contacts 22C and 22D in comb form may be formed between two outer periphery fixed contacts 23A and 23B in arc form so as to be engaged with each other, as in FIG. 7C. In this configuration, stable change in the resistance value can be gained, even in the case where the position of second resistor layer 13 and first resistor layer 12 is slightly shifted from the center.

As described above, according to the present second embodiment, spacer 20 is formed around the outer periphery of the center portion on the lower surface of first resistor layer 12, and at the same time, second resistor layer 13, in which particles 14 of different particle diameters are dispersed, is formed and layered on the lower surface of first resistor layer 12 so that second resistor layer 13 on the lower surface of spacer 20 is mounted on outer periphery fixed contact 23, and thus, a panel switch with little fluctuation in the resistance value where operation is possible without failure and reduction in the thickness is possible can be realized. Furthermore, the form of center fixed contact 22 is changed, and thus, the output can have two resistance values, or a stable resistance value.

The pressure sensitive conductive sheet and panel switch using the same according to the present invention have advantageous effects of having little fluctuation in the resistance value, making operation possible without failure, and making reduction in the thickness possible, and thus, are useful for the operation portion of various electronics.

What is claimed is:

1. A pressure sensitive conductive sheet, comprising:
   a base in film form;
   a first resistor layer formed on a lower surface of the base; and
   a second resistor layer formed and layered on a lower surface of the first resistor layer, wherein
   particles of different particle diameters are dispersed inside the second resistor layer.

2. A panel switch, further comprising a substrate on a lower surface of the pressure sensitive conductive sheet according to claim 1, wherein a number of fixed contacts are formed on an upper surface of the substrate.

* * * * *